US009689284B2

(12) United States Patent
Putz et al.

(10) Patent No.: US 9,689,284 B2
(45) Date of Patent: Jun. 27, 2017

(54) CAMSHAFT ADJUSTING DEVICE

(71) Applicant: Schaeffler Technologies AG & Co. KG, Herzogenaurach (DE)

(72) Inventors: Boris Putz, Furth (DE); Ali Bayrakdar, Rothenbach/Pegnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 110 days.

(21) Appl. No.: 14/779,457

(22) PCT Filed: Feb. 11, 2014

(86) PCT No.: PCT/DE2014/200051
§ 371 (c)(1),
(2) Date: Sep. 23, 2015

(87) PCT Pub. No.: WO2014/173396
PCT Pub. Date: Oct. 30, 2014

(65) Prior Publication Data
US 2016/0069224 A1 Mar. 10, 2016

(30) Foreign Application Priority Data
Apr. 24, 2013 (DE) .................. 10 2013 207 383

(51) Int. Cl.
*F01L 1/34* (2006.01)
*F01L 1/344* (2006.01)
(Continued)

(52) U.S. Cl.
CPC ............... *F01L 1/344* (2013.01); *F01L 1/047* (2013.01); *F01L 1/3442* (2013.01);
(Continued)

(58) Field of Classification Search
CPC ......... F01L 1/047; F01L 1/344; F01L 1/3442; F01L 2001/0476; F16C 19/16; F16C 35/077
(Continued)

(56) References Cited

U.S. PATENT DOCUMENTS 8,047,171 B2 * 11/2011 Strauss .................... F01L 1/02
123/90.15
2007/0095315 A1 5/2007 Hoppe et al.
(Continued)

FOREIGN PATENT DOCUMENTS

DE 102005052481 5/2007
DE 102010005603 7/2011
(Continued)

*Primary Examiner* — Ching Chang
(74) *Attorney, Agent, or Firm* — Volpe and Koenig, P.C.

(57) ABSTRACT

A camshaft adjusting device, including a camshaft (1) and a camshaft adjuster (2) having a stator (5) that can be connected to a crankshaft of an internal combustion engine and a rotor (4) that is rotatably mounted in the stator (5) and can be connected to the camshaft (1) and a clamping device (3) for clamping the rotor (4) to the camshaft and a rolling bearing (8) absorbing both axial and radial forces for mounting the camshaft adjusting device in a stationary housing (11), wherein the rotor (4) is clamped to the camshaft (1) by the clamping device (3) via an inner ring (12) or an outer ring (13) of the rolling bearing (6).

7 Claims, 2 Drawing Sheets

(51) Int. Cl.
*F01L 1/047* (2006.01)
*F16C 35/063* (2006.01)
*F16C 35/077* (2006.01)
*F16C 19/16* (2006.01)

(52) U.S. Cl.
CPC ....... *F01L 2001/0476* (2013.01); *F16C 19/16* (2013.01); *F16C 35/063* (2013.01); *F16C 35/077* (2013.01); *F16C 2360/18* (2013.01)

(58) Field of Classification Search
USPC .......................................... 123/90.15, 90.17
See application file for complete search history.

(56) References Cited

U.S. PATENT DOCUMENTS

| | | |
|---|---|---|
| 2011/0139101 A1 | 6/2011 | Dietz |
| 2011/0315100 A1 | 12/2011 | Schneider et al. |
| 2015/0144082 A1 | 5/2015 | Strauss et al. |

FOREIGN PATENT DOCUMENTS

| | | |
|---|---|---|
| EP | 1979582 | 9/2010 |
| EP | 2326804 | 6/2011 |
| FR | 2406749 | 5/1979 |
| WO | 2007082600 | 7/2007 |
| WO | 2010020507 | 2/2010 |
| WO | 2014029391 | 2/2014 |

\* cited by examiner

CAMSHAFT ADJUSTING DEVICE

BACKGROUND

The invention relates to a camshaft adjusting device.

A camshaft adjusting device according to the class is known, for example, from EP 1 979 582 B1. The camshaft adjusting device comprises a camshaft and a camshaft adjuster that has, in its basic construction, a stator that can be driven by a crankshaft and a rotor that is rotationally locked with the camshaft. Between the stator and the rotor there is a ring-shaped space that is divided by radially inward extending projections rotationally locked with the stator into a plurality of pressure chambers that are each divided by a vane extending radially outward from the rotor into two work chambers of opposite effective directions. Depending on the charging of the work chambers with a pressurized medium, the rotor is then adjusted into an "advanced" or "retarded" position relative to the stator and thus also the camshaft relative to the crankshaft.

In one proven embodiment, the camshaft adjuster is clamped onto the camshaft by a central screw that is inserted through a central opening of the rotor and is screwed into an internal thread of the camshaft. For supporting the clamped assembly made from the camshaft and the camshaft adjuster in a stationary housing, typically axial and radial sliding bearings are used.

Furthermore, from DE 10 2010 005 603 A1 it is known to support the camshaft together with the camshaft adjuster with a ball bearing in a housing. The ball bearing is arranged with its inner ring on a housing element that is connected rigidly to the camshaft. The ball bearing also connects with the outer ring to a drive element and is secured against slipping out by a retaining ring.

From EP 2 326 804 B1, a camshaft adjuster with a rolling bearing is also known in which the inner ring of the rolling bearing is arranged on the camshaft and the outer ring is arranged in the cylinder head of the internal combustion engine. The inner ring is not secured in the axial direction with respect to the camshaft, so that this is obviously a movable bearing. An axial bearing is not recognized, but nevertheless must be provided.

In view of this background, the invention is based on the object of creating a camshaft adjusting device with a camshaft and a camshaft adjuster with a simplified axial and radial support.

SUMMARY

To achieve this objective, according to the basic idea of the invention it is provided that the rotor is clamped on the camshaft by the tensioning device by an inner ring or an outer ring of the rolling bearing. The proposed solution can considerably simplify the support of the camshaft adjusting device, because axial forces can be introduced into the rolling bearing by the clamping of the rotor by the inner or outer ring of the rolling bearing, so that the rolling bearing is used, in addition to the radial support, also for the axial support. In this way, the previously required, additional axial support can be eliminated.

Here, the clamping can be realized in an especially simple way if the inner ring or the outer ring, by which the rotor is clamped, is axially longer than the inner ring or outer ring that is held fixed on the housing. The axially longer inner or outer ring therefore forms an axially projecting clamping surface by which the inner or outer ring can be clamped, without the inner or outer ring held fixed on the housing also being clamped.

Furthermore, the rotor can also have at least one axial projection with which the rotor contacts the inner ring or outer ring. The axial projection is used for the same purpose, namely, the creation of an axially projecting clamping surface, so that the inner and outer ring of the rolling bearing can have an identical axial length.

It is further provided that the rolling bearing is a ball bearing. Ball bearings are one very economical embodiment of a rolling bearing that receives both axial and also radial forces, because the balls can transmit both axial and also radial forces. In this way, one ring of rolling bodies in the rolling bearing is sufficient to fulfill the function. The use of a single ring of rolling bodies means that the required installation space for the arrangement of the rolling bearing is also very low.

It is further provided that the tensioning device is formed by a central screw. The central screw can implement a very uniform tensioning of the rotor that can also be realized in an easy-to-assembly way by a single screw-in process.

According to another preferred refinement of the invention, it is provided that the camshaft has a rotationally locked threaded insert, into which the central screw is screwed and on which a bearing seat is provided for the arrangement of the rolling bearing. Through the proposed solution, for the camshaft itself, a tube can be provided for production, in which the threaded insert is then, e.g., screwed or fused. The fastening of the camshaft adjuster on the camshaft is then performed by the threaded insert that also has the bearing seat required for the support of the camshaft adjusting device for the arrangement of the rolling bearing. In this way, the essential, required functional surfaces are formed on the threaded insert and the camshaft itself must not be further processed at least on this end.

The bearing seat can be arranged, according to another preferred embodiment of the invention, on a ring projection of the threaded insert pointed in the direction of the rotor, wherein the ring projection is dimensioned in axial length such that a gap is provided between the end side of the ring projection and the rotor. By dimensioning the ring projection, it can be prevented that, instead of the rotor becoming clamped by the inner or outer ring, it comes into contact with the end side of the threaded insert in advance, and thus is clamped between the tensioning device and the threaded insert. In this way it can be guaranteed that the axial forces are introduced in each case into the rolling bearing, which is, in turn, advantageous for a clearly defined support of the camshaft adjusting device.

BRIEF DESCRIPTION OF THE DRAWINGS

Below, the invention will be explained in more detail with reference to two preferred embodiments. Here, the figures show, in detail.

DETAILED DESCRIPTION OF THE PREFERRED EMBODIMENTS

Figure 1:
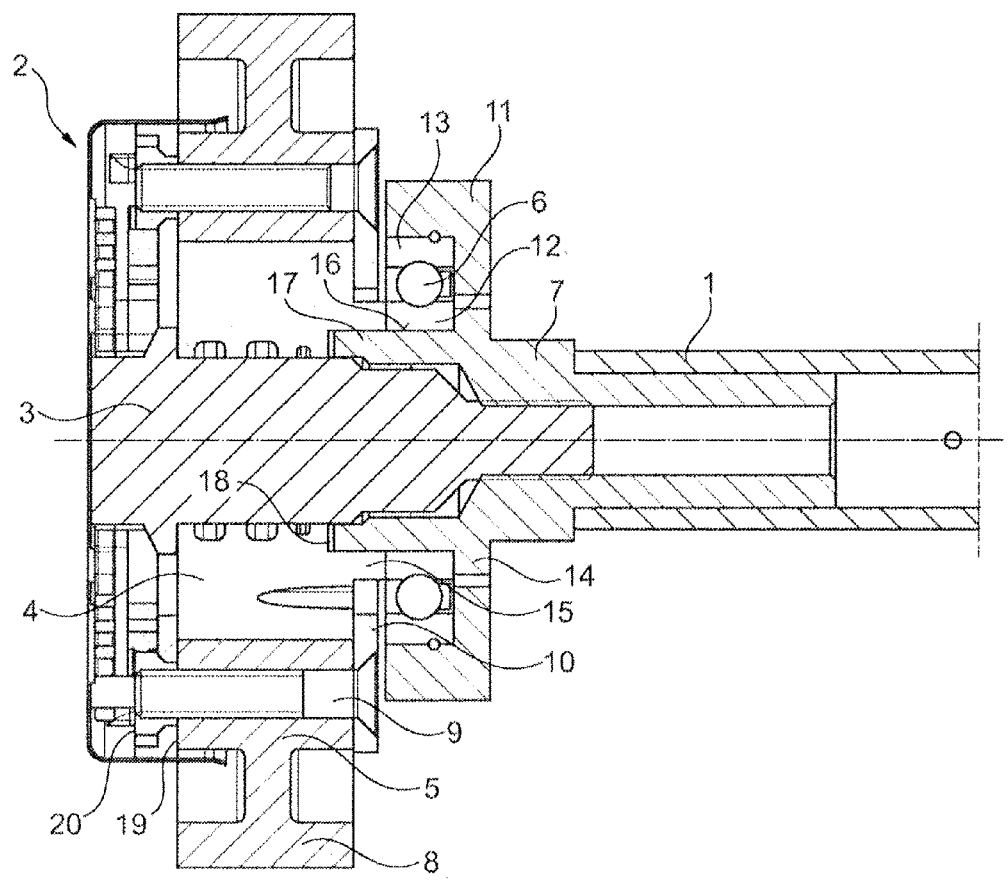
FIG. 1: a camshaft adjusting device with a camshaft and a camshaft adjuster according to a first embodiment of the invention, and FIG. 2 a camshaft adjusting device with a camshaft and a camshaft adjuster according to a second embodiment of the invention.

In FIG. 1, a camshaft adjusting device according to the invention for an internal combustion engine can be seen, with a camshaft 1 and a camshaft adjuster 2. The camshaft adjuster 2 comprises a stator 5 that can be driven by a crankshaft and a rotor 4 that is locked in rotation with the camshaft 1. On the stator 5 there is a drive wheel 8 that is wrapped around by an endless traction mechanism for transferring the rotational movement of the crankshaft. Instead of the drive wheel 8, toothing could also be provided, depending on whether a chain, toothed belt, or belt without toothing is provided as the endless traction mechanism for transmitting the rotational movement. The stator 5 also has a plurality of stator webs with passage holes that are arranged in these webs and divide a ring chamber between the stator 5 and the rotor 4 into multiple pressure chambers. The rotor 4 has a plurality of vanes that extend radially outward up to the inner wall of the stator 5 and divide each pressure chamber into two work chambers of different effective direction. Furthermore, a first sealing cover 10 is provided that also has passage holes and is screwed with fastening screws 9 through the passage holes of the stator 1 into threaded inserts 20 of an opposing second sealing cover 19, so that the sealing covers 10 and 19, together with the stator 5, then form a rotationally locked assembly. The work chambers are filled with a pressurized medium while the internal combustion engine is running at least after a certain start-up phase, wherein the rotational movement of the stator 5 is transmitted to the rotor 4 and thus also the rotational movement of the crankshaft is transmitted to the camshaft 1.

Furthermore, a threaded insert 7 is rotationally locked to the camshaft 1 which is, e.g., fused or screwed to the camshaft 1. The threaded insert 7 has an internal thread in which a tensioning device 3 in the form of a central screw is screwed in for tensioning the rotor 4 with the camshaft 1. The threaded insert 7 further comprises a ring projection 17 with a radially outer bearing seat 16 on which a rolling bearing 6 is arranged with an inner ring 12. The rolling bearing 6 is held with an outer ring 13 in a bearing mount of a stationary housing 11 and is thus used for supporting the camshaft adjusting device opposite the housing 11. The housing 11 can be, e.g., a cylinder head or a cylinder head cover of the internal combustion engine.

According to the first embodiment shown in FIG. 1, the rotor comprises a projection 15 that extends through a central opening of the first sealing cover 10 and with which it contacts the inner ring 12 of the rolling bearing 6 shown on the left side in the figure. The inner ring 12 is further supported on the right side on a clamping flange 14 of the threaded insert 7. The ring projection 17 of the threaded insert 7 is dimensioned in length such that, between the end side of the ring projection 17 and the rotor 4, there is a gap 18. Due to the gap 18, the rotor 4 is supported on the inner ring 12 of the rolling bearing 6 only by the projection 15 with tensioning by the central screw. This projection is, in turn, supported by the clamping flange 14 of the threaded insert 7 on the camshaft 1. Therefore, the rotor 4 is clamped by the inner ring 12 of the rolling bearing 6 relative to the camshaft 1 and the axial forces that occur are introduced via the rolling bearing 6 into the housing 11. The inner ring 12 and the outer ring 13 of the rolling bearing 6 are constructed with an identical axial length. In this way, a rolling bearing 6 with a conventional structure can be used.

Figure 2:
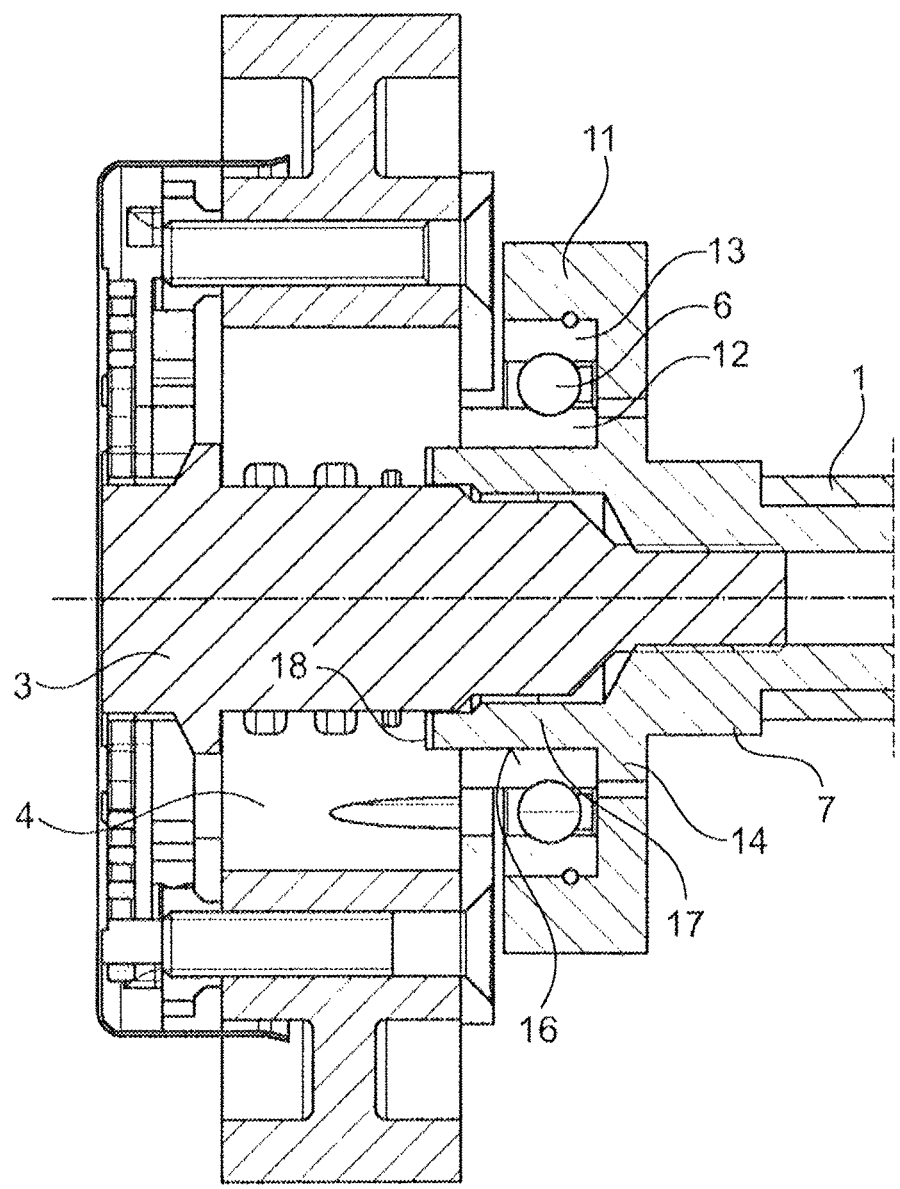

According to the second embodiment shown in FIG. 2, the inner ring 12 has a larger axial length than the outer ring 13, so that the projection 15 on the rotor 4 can be omitted or can have a correspondingly shorter construction. All that is important for the solution according to the invention is that the rotor 4 is supported on the inner ring 12 of the rolling bearing 6, wherein additional intermediate components can also be present.

The rolling bearing 6 is preferably formed by a one-row or two-row ball bearing that is suitable for transmitting both radial forces and also axial forces into the housing 11. In this way, a one-row ball bearing is especially preferred for reasons of costs and installation space, if the ball bearing can absorb the magnitude of axial forces that might occur.

LIST OF REFERENCE NUMBERS

1 Camshaft
2 Camshaft adjuster
3 Tensioning device
4 Rotor
5 Stator
6 Rolling bearing
7 Threaded insert
8 Driving ring
9 Fastening screw
10 First sealing cover
11 Housing
12 Inner ring
13 Outer ring
14 Clamping flange
15 Projection
16 Bearing seat
17 Ring projection
18 Gap
19 Second sealing cover
20 Threaded insert

The invention claimed is:

1. A camshaft adjusting device comprising:
 a camshaft,
 a camshaft adjuster including,
 a stator that is connectable to a crankshaft of an internal combustion engine, and
 a rotor that is rotatably supported in the stator and is connected to the camshaft, and
 a tensioning device for clamping the rotor to the camshaft, and
 a rolling bearing that receives both axial and also radial forces for supporting the camshaft adjusting device in a stationary housing, wherein
 the rotor is clamped on the camshaft by the tensioning device via an inner ring or an outer ring of the rolling bearing.

2. The camshaft adjusting device according to claim 1, wherein
 the one of the inner ring or the outer ring, by which the rotor is clamped, is axially longer than the other of the inner ring or the outer ring, which is held fixed on the housing.

3. The camshaft adjusting device according to claim 1, wherein
 the rotor has at least one axial projection with which the rotor connects to the inner ring or the outer ring.

4. The camshaft adjusting device according to claim 1, wherein
 the rolling bearing is a ball bearing.

5. The camshaft adjusting device according to claim 1, wherein
 the tensioning device is formed by a central screw.

6. The camshaft adjusting device according to claim 5, wherein a rotationally locked threaded insert is provided on the camshaft, and the central screw is screwed into said threaded insert and a bearing seat for placement of the rolling bearing is provided on said threaded insert.

7. The camshaft adjusting device according to claim 6, wherein
the bearing seat is arranged on a ring projection of the threaded insert pointed in a direction of the rotor and the ring projection is dimensioned in axial length such that a gap is provided between an end side of the ring projection and the rotor.

* * * * *